UNITED STATES PATENT OFFICE.

AMBROSE G. FELL, OF NEW YORK, N. Y.

MANUFACTURE OF GLUCOSE.

SPECIFICATION forming part of Letters Patent No. 270,042, dated January 2, 1883.

Application filed July 24, 1882. (No specimens.)

*To all whom it may concern:*

Be it known that I, AMBROSE G. FELL, of New York city, in the county and State of New York, have invented a new and useful Improvement in the Manufacture of Glucose, which improvement is fully set forth in the following specification.

This invention has reference to the manufacture of glucose and grape-sugar from grain or other substances containing starch, or from the starch obtained therefrom, and has for its object the more complete separation from the saccharine solution of the organic impurities and the production of a purer and better product than is obtained by the processes in common use.

In the manufacture of glucose by the ordinary processes one of two methods is adopted. The starch is either separated from the grain by the means ordinarily employed in starch-manufacture, and the starch thus obtained converted into glucose by converting agencies, or the grain itself, in a whole or reduced condition, is acted upon directly by the converting agents. The converting agents generally employed are either sulphuric or some other acid, or a mixture of acids or diastase; but whatever the means and the substances acted upon thereby, the resulting saccharine solutions are alike in one particular, to wit: they contain in solution more or less gluten and other organic matter, which, if allowed to remain, impairs the flavor and other qualities of the ultimate product. Such impurities are ordinarily removed by treatment with animal charcoal; but the said organic matter enters the pores thereof and impairs its capacity—that is, necessitates the use of a larger amount of coal than would have been required had the liquor been free from such organic contamination; and, further, when the animal coal thus used is washed and reburned for reuse for a like purpose portions of the organic matter remain in its pores and are charred therein, becoming, as it were, part of the coal, tending not only to close the pores thereof, thus impairing its usefulness as a decolorizer and purifier, but also imparting bad flavors to subsequent saccharine liquors for the treatment of which it may be employed.

In the production of glucose by treating grain direct, according to the process ordinarily pursued, a given quantity of grain in a more or less reduced condition is heated in acidulated water until the usual iodine or alcohol tests indicate that all the starch has been converted into glucose. The saccharine liquor, with the insoluble portions of the grain floating therein, is drawn off into a suitable tank, and sufficient lime carbonate or its equivalent added to and mixed therewith to neutralize the acid previously employed to convert the starch. Next, the clear liquor is filtered from the insoluble matter, and is either boiled down to some required density and then filtered through animal coal, or is first treated with the animal coal and then concentrated by boiling; but whichever method is practiced it will be noticed that the liquor has had no chance to become in any wise cool, the process being a continuous one. In fact, means are provided and care taken to keep the liquor hot from the commencement of the process until the product is finished, for it has generally been supposed that it is essential to obtaining the best results that the temperature should be maintained from one stage to another of the process until the operation is complete; but I have found that if the perfectly clear solution, after filtration while hot to remove insoluble portions of the grain, be allowed to cool, it will gradually become turbid, and after a time a sediment will settle from the solution, which is due to the fact that certain of the organic matters of the grain which had been dissolved by the action of the hot acidulated water in the operation of conversion is not so soluble at a low temperature as it is at a more elevated heat, and hence is precipitated on cooling.

The sediment, when formed, will again dissolve and the liquor become as clear as originally if the temperature is again raised to the point at which it was filtered. If, nevertheless, this hot solution, however clear it may be, is passed through the animal coal, the coal will extract the organic matter which constituted the sediment, as seen in the cooled liquor. The pores of the coal thus become filled with this organic matter, and its capacity for discolorizing and otherwise purifying the saccharine solution is thereby greatly lessened and the quality of the liquor treated therewith proportionately injured, as before explained, and this becomes more noticeable as the coal is repeatedly reburned and used for the same purpose; but if the liquor, before it is filtered through the animal coal, is cooled by any suitable means, and when cold is filtered by any suitable apparatus, so that all the sediment formed by the cooling is separated and a clear cold liquor obtained, the liquor will remain perfectly clear, and if reheated and passed through the animal coal will now be much purer both in color and flavor, and a much smaller amount of coal will be necessary; or, after separating the organic matter by cooling and filtering, the saccharine solution may be reduced to sirup without treating it with animal coal; or it may be filtered through the animal coal without reheating it; or it may be finished in any other way; but whatever method may be employed to complete the sirup or sugar, its ultimate flavor and purity is greatly improved by removing the organic matter, which I find is precipitable and removable by the processes of cooling and filtering described.

In order that the invention may be the better understood, I will now describe it in connection with the process of glucose-manufacture as I prefer to use it.

In a suitable vessel the grain is acted upon by water, heat, and acid in the usual manner, until its starch and other convertible elements are converted into saccharine, ascertainable by the usual tests, as is well understood. The saccharine solution is next drawn off and its acid neutralized by the addition of carbonate of lime, and the clear solution next filtered from the insoluble portions of the grain. The clear liquor is next concentrated to about 30° Baumé by boiling, and it is at this stage of the process that I prefer to apply my improvement, although it may be introduced at other stages, as hereinafter described. The concentrated liquor at 30° Baumé, or thereabout, is now drawn off into a tank, and from this tank allowed to flow in a gentle stream over troughs provided with double bottoms. Between these double bottoms cold water is kept flowing, so that the saccharine solution is thoroughly cooled in its passage over the troughs, and from this tank it is filtered by any suitable means, (preferably by means of filter-presses,) and after being thus cooled and filtered the liquor can be finished in the usual way, proceeding as is customary with liquor of 30° Baumé for the production of glucose or grape-sugar therefrom.

This improvement does not vary or substitute any of the usual methods observed in glucose-manufacture, but is in addition thereto.

The lower the temperature to which the impure saccharine solution is reduced the greater the amount of sediment formed, and therefore the lower the temperature at which it is filtered the greater the amount of organic impurities removed therefrom and the purer the resulting liquor in consequence, and thus the purification can be regulated according as the impure liquor is lowered in temperature previous to filtering, either by simple cold water or by refrigerating means.

As before stated, the cooling and filtering may be introduced immediately after neutralization before filtering out the insoluble portion of the grain; or the dissolved organic matter may be separated by cooling and filtering the clear liquor immediately after its separation from the insoluble portions of the grain; or the cooling and filtering may be advantageously introduced at any stage of the process, as convenience or required results may suggest. In like manner the cooling apparatus or means may be of any form or nature and the cooling or refrigerating carried to any extent found desirable, according to results aimed at; but in the manufacture of ordinary glucose or sirup I prefer to introduce the cooling and cold filtering to separate the soluble organic matter at the stage of the process and in the manner and for the purpose described.

This method of purification may also be advantageously employed for the treatment of impure sirups, sugars, or saccharine solutions of other natures than that herein specifically described.

What I claim as new, and desire to secure by Letters Patent, is—

1. In the manufacture or purification of glucose or grape-sugar from grain or starch, the separation of the gluten and similar organic impurities from the saccharine solution by cooling the hot solution to precipitate the said gluten and similar impurities and removing the precipitate, substantially as described.

2. In the manufacture or purification of glucose or grape-sugar from grain or starch, the separation of the gluten and similar organic matters by cooling and the subsequent treatment of the saccharine solution with animal coal, substantially as described.

3. In the purification of saccharine solutions, the cooling and cold filtration of the solution for removal of gluten and like organic impurities, substantially as described.

4. The method of making purified glucose or grape-sugar from grain or starch by acting upon the said grain or starch with suitable converting agents, with the aid of heat, subsequently cooling the hot saccharine solution and removing the precipitate which forms as a result of the cooling, and finally treating the solution with animal coal or other suitable finishing operation, substantially as described.

5. In the manufacture of glucose or grape-sugar, the concentration, by boiling, of the saccharine solution obtained by conversion of starch, and the cooling of the hot solution and removal of the precipitate resulting from said cooling, and prior to the treatment with animal coal or finishing operation, substantially as described.

6. The method of making and purifying glucose or grape-sugar by first acting upon grain or starch with converting agents—such as water and acid—with the aid of heat; second, neutralizing the solution after conversion is accomplished; third, filtering or otherwise removing the grosser impurities from the solution; fourth, cooling the hot solution, with or without previous concentration thereof; fifth, filtering or otherwise removing the precipitate formed by cooling; and, finally, filtering the solution through animal coal, or finishing in other suitable ways, substantially as described.

In testimony whereof I have signed this specification in the presence of two subscribing witnesses.

A. G. FELL.

Witnesses:
B. F. LEE,
JOHN MCCLURE.